(12) United States Patent
Groover et al.

(10) Patent No.: US 9,329,856 B2
(45) Date of Patent: May 3, 2016

(54) MANAGING A CODE LOAD (71) Applicant: International Business Machines Corporation, Armonk, NY (US)

(72) Inventors: Michael P. Groover, Vail, AZ (US); Robin Han, Lincoln, CA (US); Yan Su, Huzhou (CN); Wei Tang, Shanghai (CN); Ming Zhi Zhao, Shanghai (CN); Yi Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/219,082

(22) Filed: Mar. 19, 2014

(65) Prior Publication Data

US 2015/0268946 A1 Sep. 24, 2015

(51) Int. Cl.
*G06F 9/44* (2006.01)
*G06F 9/445* (2006.01)
(52) U.S. Cl.
CPC . *G06F 8/665* (2013.01); *G06F 8/65* (2013.01)
(58) Field of Classification Search
CPC .................................................. G06F 8/665
USPC .............................................. 717/168
See application file for complete search history.

(56) References Cited

U.S. PATENT DOCUMENTS

| 7,661,018 | B2 | 2/2010 | Brundidge et al. |
| 8,117,293 | B1* | 2/2012 | Anderson ..................... 709/223 |
| 8,473,939 | B2 | 6/2013 | Helman et al. |
| 2007/0168573 | A1* | 7/2007 | Kim ......................... G06F 8/65 710/10 |
| 2012/0079100 | A1* | 3/2012 | McIntyre et al. ............. 709/224 |
| 2012/0173953 | A1* | 7/2012 | Flynn et al. ................... 714/758 |
| 2014/0228005 | A1* | 8/2014 | Huang et al. ............... 455/414.1 |

FOREIGN PATENT DOCUMENTS

WO 2012148426 A1 11/2012

* cited by examiner

*Primary Examiner* — Li B Zhen
*Assistant Examiner* — Sen Chen
(74) *Attorney, Agent, or Firm* — Stosch Sabo; Jennifer Anda (57) ABSTRACT

A method and system for managing a code load for a storage system is disclosed. The method and system can include instantiating a code load. The code load can include a first update for a first component and a second update for a second component. The method and system can include monitoring the operational state of the first and second components in response to instantiating the code load. The method and system can also include determining to perform the first update in response to a triggering event. The method and system can also include performing the first update in response to determining to perform the first update.

11 Claims, 5 Drawing Sheets

MANAGING A CODE LOAD

BACKGROUND

Aspects of the present disclosure relate to computer system storage facilities. More particular aspects relate to storage component firmware updates.

In data storage facilities, components and systems may receive code updates. Before initiating a code update to a component, the component may undergo a state health check to determine that it is in operational condition. As code updates to components and data storage facilities become more frequent, the need for managing code updates and state health checks may also increase.

SUMMARY

Aspects of the present disclosure are directed toward a computer implemented method for managing a code load for a storage system. In certain embodiments, the method can include instantiating a code load. The code load can include a first update for a first component. In response to instantiating the code load, the method can include monitoring the operational state of the first component. The method can include determining to perform the first update in response to a triggering event. The method can also include performing at least the first update in response to determining to perform the first update.

Aspects of the present disclosure, in certain embodiments, are directed toward a computer implemented method for managing a code load for a first component and a second component of a storage system. In certain embodiments, the method can include instantiating a code load. The code load can include a first update for a first component and a second update for a second component. The method can include monitoring the operational state of the first and second components in response to instantiating the code load. In certain embodiments, the method can include determining to perform the first update. Determining to perform the first update can be performed in response to a status change event associated with the operational state of the first component. The method can also include performing at least the first update in response to determining to perform the first update. Performing the first update can occur within substantially the same time frame as determining to perform the second update.

Aspects of the present disclosure, in certain embodiments, are directed toward a system for managing a code load for a first storage component. The system can include an instantiating module configured to instantiate a code load. The code load can include a first update for the first storage component. The system can also include a monitoring module configured to monitor the operational state of the first storage component in response to instantiating the code load. In certain embodiments, the system can include a determining module configured to determine to perform the first update. Determining to perform the first update can take place in response to a triggering event associated with the first storage component. In certain embodiments, the system can include a performing module configured to perform at least the first update in response to determining to perform the first update.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer system storage facilities. More particular aspects relate to storage component firmware updates. While the present disclosure is not necessarily limited to such applications, various aspects of the disclosure may be appreciated through a discussion of various examples using this context.

Aspects of the present disclosure, in certain embodiments, are directed toward a methodology and system for managing a code load for a storage system. In certain embodiments, the methodology can include instantiating a code load. The code load can include a first update for a first component. The methodology can include monitoring the operational state of the first component. The methodology may include determining to perform the first update in response to a triggering event. The methodology can also include performing at least the first update in response to determining to perform the first update.

Aspects of the present disclosure relate to the recognition that, in certain situations, performing a code load or code update process (e.g., a firmware update) to one or more components within a storage system can be a time-consuming process. Multiple components within the storage system may require code updates, and it may be desirable to perform health state checks on each component before the update process, to avoid code-load failure, damage to the updating components, or other errors that may result from initiating a code-load to a component that is not in a fully operational condition. Accordingly, aspects of the present disclosure are directed toward a method and system for reducing the length of time involved in performing a code-load process. More particularly, the present disclosure is directed toward a method and system for monitoring the operational condition of the components within the storage system, and initiating a health state check (e.g., analyzing the operational state of a component) when indicated by a status change event in one or more components. Further, the method and system of the present disclosure are directed toward overlapping the duration of the code-load process of a first component with the duration of a health state check of a second component. The present disclosure may provide benefits associated with fewer code-load errors and faster code-load processes.

Aspects of the present disclosure include a method and system for managing a code load for a storage system. The method and system may work on a number of devices and operating systems. The method and system can include instantiating a code load including a first update for a first component. For example, the first component may be a storage device configured within a data storage system.

Aspects of the present disclosure can include monitoring the operational state of the first component. Monitoring the operational state of the first component can include using a resource management database. The resource management database can include information regarding the operational state of the first component, as well as other devices in the storage system. For example, the resource management database can include information regarding whether a component is operational, non-operational, in a resource-fenced state, and the like. The resource management system can include interfaces configured to allow system processes to register a callback function that will be invoked when specific information in the resource management database changes.

Aspects of the present disclosure can include determining to perform the first update in response to a triggering event associated with the first component. The triggering event can include a status change event of the operational state of the first component in the resource management database. For example, the triggering event could be associated with the first component changing from a non-operational state to an operational state. Other triggering events are also possible. Determining to perform the first update can further comprise analyzing, by an event handler, of the triggering event and the operational state of the first component. A different event handler can be used depending on the type and status change event of the first component. Determining to perform the first update can further comprise writing, in a system file, a recommended action to take regarding the first update.

Aspects of the present disclosure can include performing at least the first update in response to determining to perform the first update. Performing the first update can further comprise reading the system file, and taking the recommended action. For example, the recommended action can include suspending the code load, or continuing the code load.

Aspects of the present disclosure are, in certain embodiments, directed toward a system and method for instantiating a code load. The code load may include a first update for a first component and a second update for a second component. The method can include monitoring a second operational state of the second component. Monitoring the second operational state of the second component can include using a resource management database containing information regarding whether a component is operational, non-operational, in a resource-fenced state, and the like. The method can also include determining, within substantially the same time frame as performing the first update, to perform the second update. In response to determining to perform the second update, the method can include performing the second update.

Figure 1:
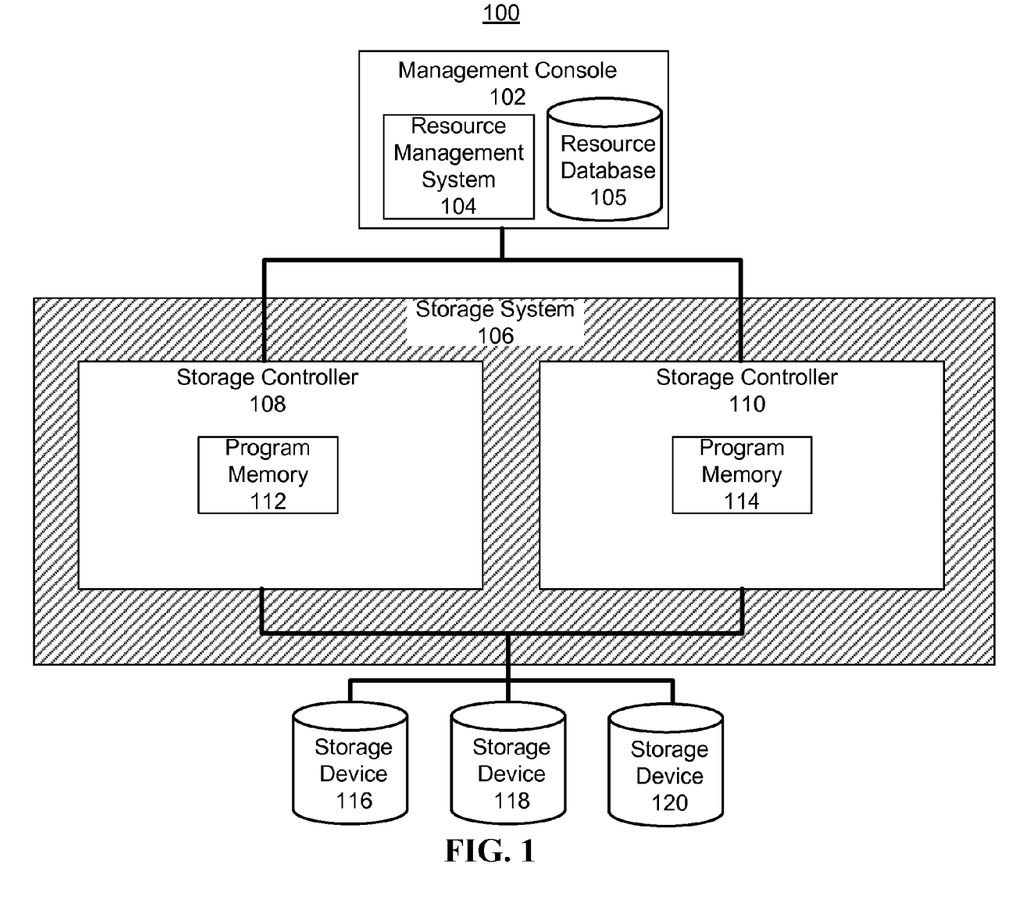
FIG. 1 illustrates a computer storage network architecture according to embodiments.

Turning now to the figures, FIG. 1 illustrates a computer storage network architecture, consistent with embodiments of the present disclosure. Aspects of FIG. 1 are directed toward a computer storage network architecture that facilitates the implementation of a method for managing a codeload. The computer storage network architecture 100 is presented to show one example of an environment where a system and method in accordance with the present disclosure may be implemented. The computer storage network architecture 100 is presented only by way of example and is not intended to be limiting. The system and methods disclosed herein may be applicable to a wide variety of different computers, servers, storage devices, and network architectures, in addition to the computer storage network architecture 100 shown.

As shown in FIG. 1, the computer storage network architecture 100 can include a management console 102. The management console 102 may be part of a computer storage network architecture that includes a storage system 106. Consistent with various embodiments, the management console 102 can be communicatively connected to one or more storage controllers, such as storage controller 108 and storage controller 110 of storage system 106. The management console 102 can direct I/O requests to either or both storage controllers 108 and 110. For example, the management console 106 may detect an error in accessing a volume of storage system 106 via one storage controller (e.g., storage controller 108 or storage controller 110), and re-issue the I/O request to the alternate storage controller automatically.

As shown in FIG. 1, the storage system 106 can include one or more storage controllers 108 and 110. The storage controllers 108 and 110 can be communicatively connected to one or more storage devices, such as storage devices 116, 118, and 120. Consistent with various embodiments, the storage devices 116, 118, 120 can be hard disk drives, solid state drives, flash memory, optical disk storage, or other mediums that can be used to store information. In certain embodiments, the storage devices can be subdivided by operation of the storage controllers 108, 110 into subsets. These subsets can be referred to as volumes or storage volumes. As described herein, the term volume or storage volume is intended to represent all such logical groupings that subdivide the disk drives. Further, a subdivision may simply include defining a single storage volume that includes all storage devices of the storage system 106.

Consistent with various embodiments, the storage controllers 108, 110 can be configured to perform storage management on the storage devices 116, 118, 120. For example, in certain embodiments, the storage controllers can perform RAID (redundant array of independent disks) management to improve reliability and overall performance of the storage system 106. As shown in FIG. 1, storage controller 108 can include program memory 112, and storage controller 110 can include program memory 114. Consistent with various embodiments, the program memory 112, 114 can include firmware that defines operation of the storage controllers 108, 110. In certain embodiments, the firmware stored in the program memory 112, 114 can require updates or revisions to ensure compatibility and cooperation between the storage controllers 108, 110, and improve performance of the storage system 106.

As shown in FIG. 1, the management console 102 can include a resource management system 104. Consistent with various embodiments, the resource management system 104 can be configured to monitor the operational status of the components in the storage system 106. For example, the resource management system 104 can monitor the operational status of the storage controllers 108 and 110, as well as the operational status of one or more storage devices communicatively connected to the storage system 106, such as storage devices 116, 118, 120. In certain embodiments, the resource management system can maintain information regarding the operational status of each component in a resource database 105. For example, the resource database 105 may maintain a data table for each component in the storage system 106. The data table for each component may include information such as the component serial number, interface card identification numbers, power supply unit identifications numbers, and the like. Further, each data table may have subdivisions that store more detailed information on system components. For example, the data table for an interface card may have a subdivision that includes information such as the network adapter identification number, network protocol data, and firmware version.

Figure 2:
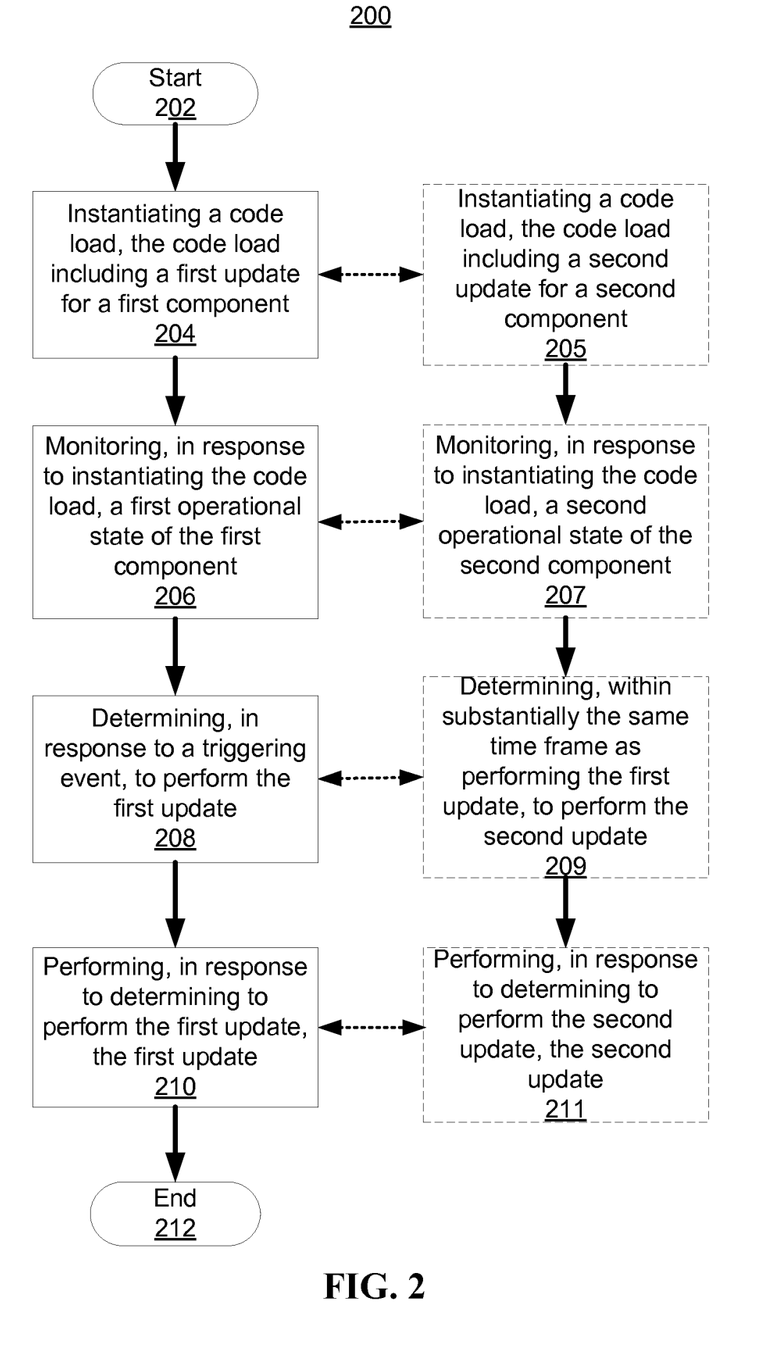
FIG. 2 is a flowchart illustrating a method for managing a code load, according to embodiments.

FIG. 2 is a flowchart illustrating a method 200 for managing a code load, consistent with embodiments of the present disclosure. Aspects of FIG. 2 are directed toward performing a code load to one or more components of a storage facility. The method 200 may begin at block 202. Consistent with various embodiments, the method can include an instantiating block 204, a monitoring block 206, a determining block 208, and a performing block 210. The method 200 may end at block 212.

Consistent with various embodiments, at block 204 the method 200 can include instantiating a code load (also referred to herein as a code update or a firmware update) to one or more components of a storage system. For example, the components can include storage controllers, network adapters, interface cards, storage media devices, power supply units and the like. In certain embodiments, multiple components of the storage system may require a code load at substantially the same time. Accordingly, at block 204 the method 200 can include instantiating a code load including a first update for a first component, and at block 205 the method 200 can include instantiating a code load including a second update for a second component. For example, in certain embodiments, the first update could be a firmware update for a storage controller, and the second update could be a firmware update for an interface adapter. Although reference is made herein to a first component and a second component, configurations involving a greater or fewer number of components and updates are also contemplated.

Consistent with various embodiments, at block 206 the method 200 can include monitoring a first operational state of the first component, and at block 207 the method 200 can include monitoring a second operational state of the second component. In certain embodiments, monitoring the operational state of the first and second components can include using a resource management system. For example, in certain embodiments, in response to instantiating a code load at block 204 (or 205), a resource management daemon can be initiated to monitor the status of the components within the storage system. In certain embodiments, information regarding the status of the components within the storage system can be stored in a resource management database. For example, the resource management database can include information regarding the operational status, serial number, interface card identification number, power supply identification number of each component in the storage system. Further, in certain embodiments, the database can include additional tables that contain more detailed information. For example, the table in the resource management database for a disk enclosure interface card may contain information such as the adapter identification number, network protocol, and firmware version.

In certain embodiments, the resource management system can provide interfaces configured to allow the resource management daemon to register a callback function to the resource management database. The callback function can be configured to be invoked in response to a status change event associated with a component of the storage system, indicated by a change in the resource management database. The callback function can initiate an event handling process to perform analysis of the component, investigate the reason for the status change event, and determine whether or not the component is capable of receiving a code update.

As shown in FIG. 2, at block 208 the method 200 can include determining to perform the first update. At block 209, the method 200 can include determining to perform the second update. In certain embodiments, determining to perform the second update can occur within substantially the same time frame as performing the first update. In certain embodiments, determining to perform the first update can occur in response to a triggering event associated with the first component. For example, in certain embodiments, the triggering event can be a status change event associated with a first component of the storage system, indicated by a change in the resource management database. In certain embodiments, determining to perform the first update can include analyzing (e.g., performing a state health check) the status change event of the first component to determine the reason for the status change, and whether the status change event affects the ability of the first component to receive a code load. In certain embodiments, analyzing the status change event can include using an event handling process. The event handling process can be initiated by a callback function registered to the resource management database. In certain embodiments, a different event handling process can be used depending on the type of the first component and the circumstances of the status change event. For example, in certain embodiments, the event handling process used for a storage controller may be different than the event handling process used for an interface adapter.

Further, in certain embodiments, determining to perform the first update can include writing, in a system file, a recommended action to take regarding the first update. The recommended action can be based on the results of the analysis of the status change event by the event handling process. In certain embodiments, the recommended action can include suspending the code load. In certain embodiments, the recommended action can include continuing the code load. For example, during a code load, if an adapter enters a resourced fenced state and triggers an analysis by the event handler, the event handler may determine that updating the firmware of the adapter is not part of the current code load, and recommend that the code load proceeds.

As an example, during a code load, a storage controller may enter a resource fenced state, in which it may be unavailable to receive a firmware update. In response to the storage controller entering the resource fenced state, the resource management daemon could detect the status change of the storage controller, and update the resource management database to indicate the status change. The callback function could be triggered by the change in the resource management database, and initiate an event handling process to analyze the storage controller and determine the reason it entered the resource fenced state, and whether or not it is capable of receiving the firmware update. In certain embodiments, the event handling process can include writing, to a system file, a recommended action regarding the code load. For example, in certain embodiments, the event handling process could recommend that the code load be suspended.

As shown in FIG. 2, at block 210 the method 200 can include performing the first update. At block 211 the method 200 can include performing the second update. Consistent with various embodiments, the first update can be performed in response to determining to perform the first update, and the second update can be performed in response to determining to perform the second update. In certain embodiments, performing the first or second update can include reading the system file written by the event handling process, and taking the recommended action. Further, as described in greater detail herein, aspects of the present disclosure are directed toward performing the first update on the first component within substantially the same time frame as determining to perform the second update on the second component.

Figure 3:
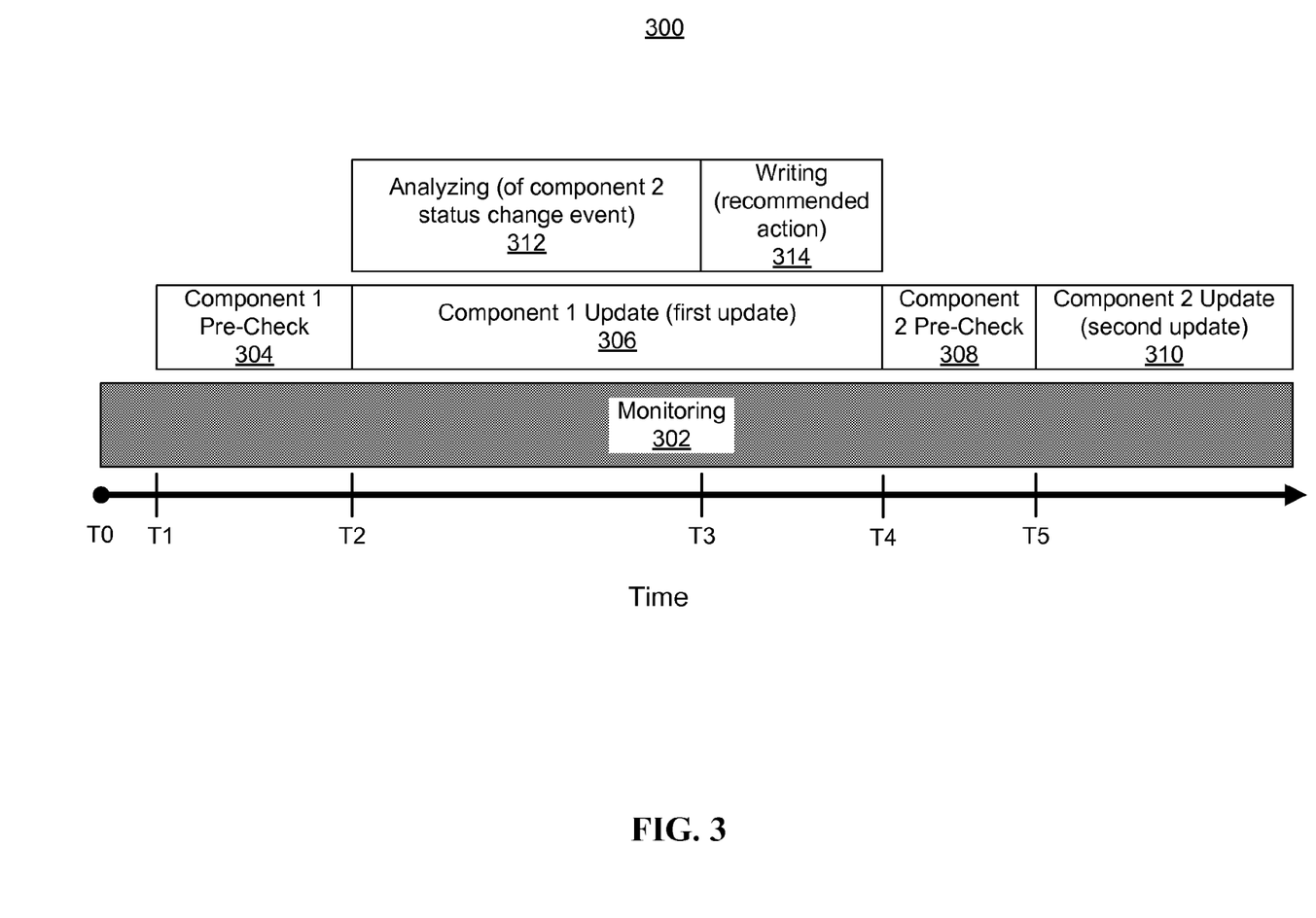
FIG. 3 illustrates a code load time frame diagram for an example code load process with a first component and a second component, according to embodiments.

FIG. 3 illustrates a code load time frame diagram for an example code load process 300 with a first component and a second component, consistent with embodiments of the present disclosure. Aspects of FIG. 3 are directed toward a code load process 300 wherein determining to perform a second update to a second component occurs within substantially the same time frame as performing a first update to a first component. More particularly the code load process 300 can include implementing a code load by overlapping the duration of health state checks (e.g., analyzing the status change event of a component and writing to a system file a recommended action) with the duration of the code load.

Consistent with various embodiments, the code load process 300 can begin at time 0. Hereafter, reference made to a particular point in time will be indicated by T0, T1 . . . TN, corresponding to the labeled points of FIG. 3. (For example, time 0 refers to the point labeled T0 of FIG. 3.) Consistent with various embodiments, the time intervals between two subsequent points (e.g., T0 and T1, T1 and T2, etc.) need not be equal. For example, the time interval between T0 and T1 may not be equal to the time interval between T2 and T3.

In certain embodiments, monitoring 302 can begin at T0. Monitoring 302 can include monitoring the status of each component in the storage system. In certain embodiments, monitoring 302 can include maintaining a resource management database with information regarding the status of each component in the storage system. In certain embodiments, monitoring 302 can continue until completion of the code load process 300. Consistent with various embodiments, before initializing a code update to a component, the code load process 300 can include performing a component pre-check to verify that the component about to receive the code update is in good operational condition. As shown in FIG. 3, at T1, the code load process 300 can perform a first component pre-check 304. In certain embodiments, the first component pre-check 304 can verify that the first component is in good operational condition, and is prepared to receive first component update 306.

Consistent with various embodiments, at T2 the code load process 300 can include initiating a first component update 306. For example, as described elsewhere herein, the first component update 306 could include a firmware update for a storage controller. In certain embodiments, monitoring 302 may detect a status change event associated with a second component. For example, the second component may have entered a resource fenced state. Accordingly, at T2, in response to detecting a status change event associated with the second component, an event handler can be initiated to perform analyzing 312 of the status change event.

At T3, the code load process 300 can include writing 314, to a system file, a recommended action to take regarding a second component update 310. In certain embodiments, writing 314 can be based on the result of analyzing 312. In certain embodiments, the recommended action could include suspending the second component update 310. In certain embodiments, the recommended action could include continuing the second component update 310. (As described elsewhere herein, analyzing 312 and writing 314 can be part of the determining step 208 of method 200.) Although analyzing 312 is described herein as directed toward a status change event of the second component, analyzing 312 need not be limited to the next component configured to receive a code update. Rather, analyzing 312 can be performed for any component in the storage system in response to a status change event.

At T4, the code load process 300 can include performing a second component pre-check 308. In certain embodiments, the second component pre-check 308 can verify that the second component is in good operational condition, and is prepared to receive second component update 310. Further, in certain embodiments, the code load process 300 can include reading the system file written at T3, and taking the recommended action. For example, in certain embodiments, the recommended action could include continuing the second component update 310. Accordingly, at T5, the code load process 300 can include performing the second component update 310. Although reference is made herein to a system including two components, the code load process 300 can be configured to accommodate code updates for storage systems with configurations of greater or fewer components as well.

Figure 4:
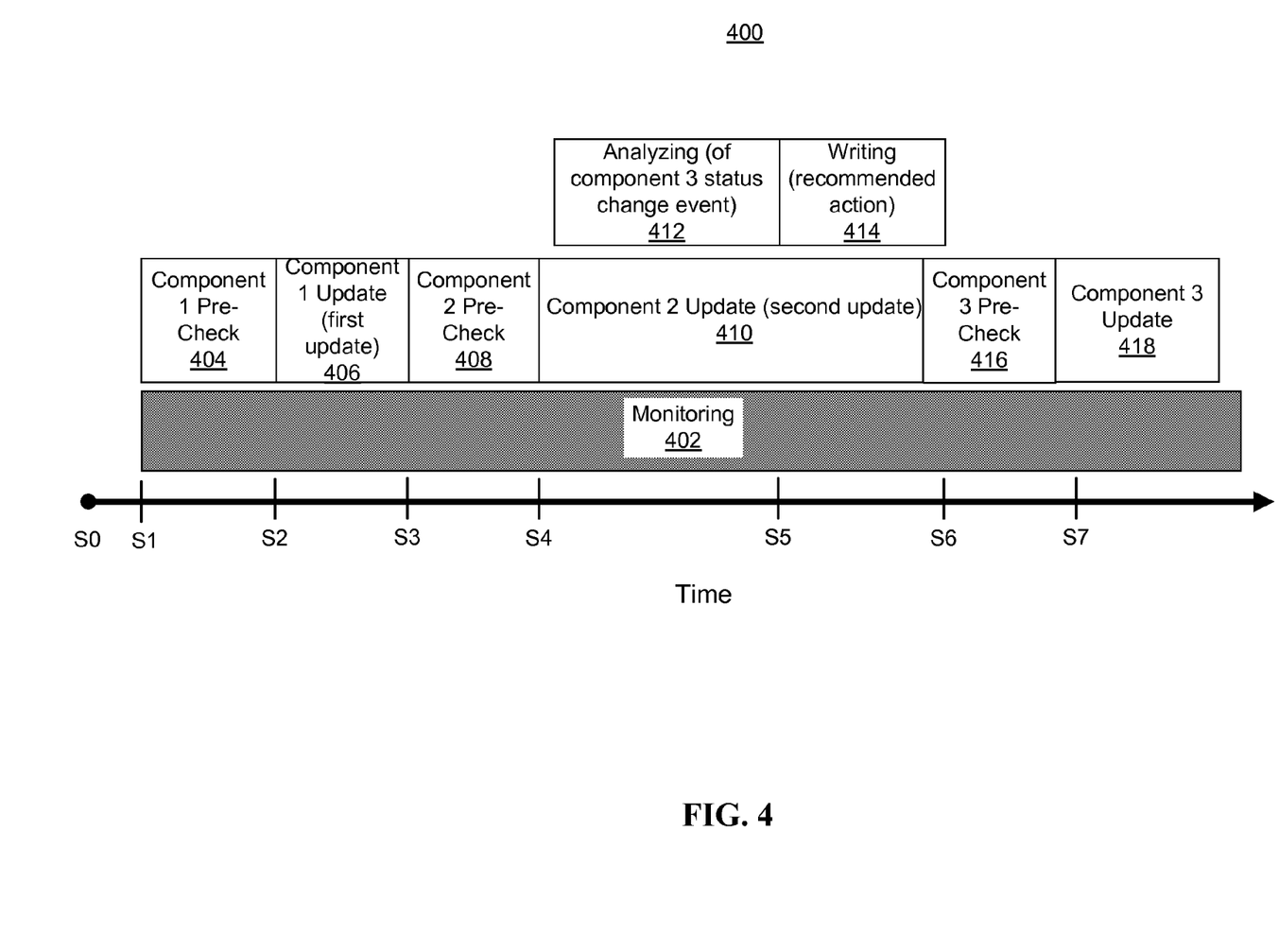
FIG. 4 illustrates a code load time frame diagram for an example code load process with a first component, a second component, and a third component, according to embodiments.

FIG. 4 illustrates a code load time frame diagram for an example code load process 400 with a first component, a second component, and a third component, consistent with embodiments of the present disclosure. Aspects of FIG. 4 are directed toward a code load process 400 wherein determining to perform a third update to a third component occurs within substantially the same time frame as performing a second update to a second component. More particularly, the code load process 400 can include implementing a code load by overlapping the duration of health state checks (e.g., analyzing the status change event of a component and writing to a system file a recommended action) with the duration of the code load.

Consistent with various embodiments, the code load process 300 can begin at time 0. Hereafter, reference made to a particular point in time will be indicated by S0, S1 . . . SN, corresponding to the labeled points of FIG. 3. (For example, time 0 refers to the point labeled S0 of FIG. 4.) Consistent with various embodiments, the time intervals between two subsequent points (e.g., S0 and S1, S1 and S2, etc.) need not be equal. For example, the time interval between S0 and S1 may not be equal to the time interval between S2 and S3.

In certain embodiments, monitoring 402 can begin at S0. Monitoring 402 can include monitoring the status of each component in the storage system. In certain embodiments, monitoring 402 can include maintaining a resource management database with information regarding the status of each component in the storage system. In certain embodiments, monitoring 402 can continue until completion of the code load process 400. Consistent with various embodiments, before initializing a code update to a component, the code load process 400 can include performing a component pre-check to verify that the component about to receive the code update is in good operational condition. As shown in FIG. 4, at S1, the code load process 400 can perform a first component pre-check 404. In certain embodiments, the first component pre-check 404 can verify that a first component is in good operational condition, and is prepared to receive first component update 406.

Consistent with various embodiments, at S2 the code load process 400 can include initiating a first component update 406. For example, as described elsewhere herein, the first component update 406 could include a firmware update for a storage controller. Upon completion of the first component update 406, at S3, the code load process 400 can perform a second component pre-check 408. In certain embodiments, the second component pre-check 408 can verify that a second component is in good operational condition, and is prepared to receive the second component update 410.

Consistent with various embodiments, at S4 the code load process 400 can include initiating a second component update 410. For example, as described elsewhere herein, the second component update 410 could include a firmware update for an interface adapter. In certain embodiments, monitoring 402 may detect a status change event associated with a third component. For example, the third component may have entered a resource fenced state. Accordingly, at S4, in response to detecting a status change event associated with the third component, an event handler can be initiated to perform analyzing 412 of the status change event.

At S5, the code load process 400 can include writing 414, to a system file, a recommended action to take regarding a third component update 418. In certain embodiments, writing 414 can be based on the result of analyzing 412. In certain embodiments, the recommended action could include suspending the third component update 418. In certain embodiments, the recommended action could include continuing the third component update 418. (As described elsewhere herein, analyzing 412 and writing 414 can be part of the determining step 208 of method 200.) Although analyzing 412 is described herein as directed toward a status change event of the third component, analyzing 412 need not be limited to the next component configured to receive a code update. Rather, analyzing 412 can be performed for any component in the storage system in response to a status change event.

At S6, the code load process 400 can include performing a third component pre-check 416. In certain embodiments, the third component pre-check 416 can verify that the third component is in good operational condition, and is prepared to receive the third component update 418. Further, in certain embodiments, the code load process 400 can include reading the system file written at S5, and taking the recommended action. For example, in certain embodiments, the recommended action could include continuing the third component update 418. Accordingly, at S7, the code load process 400 can include performing the third component update 418. Although reference is made herein to a system including three components, the code load process 400 can be configured to accommodate code updates for storage systems with configurations of greater or fewer components as well.

Figure 5:
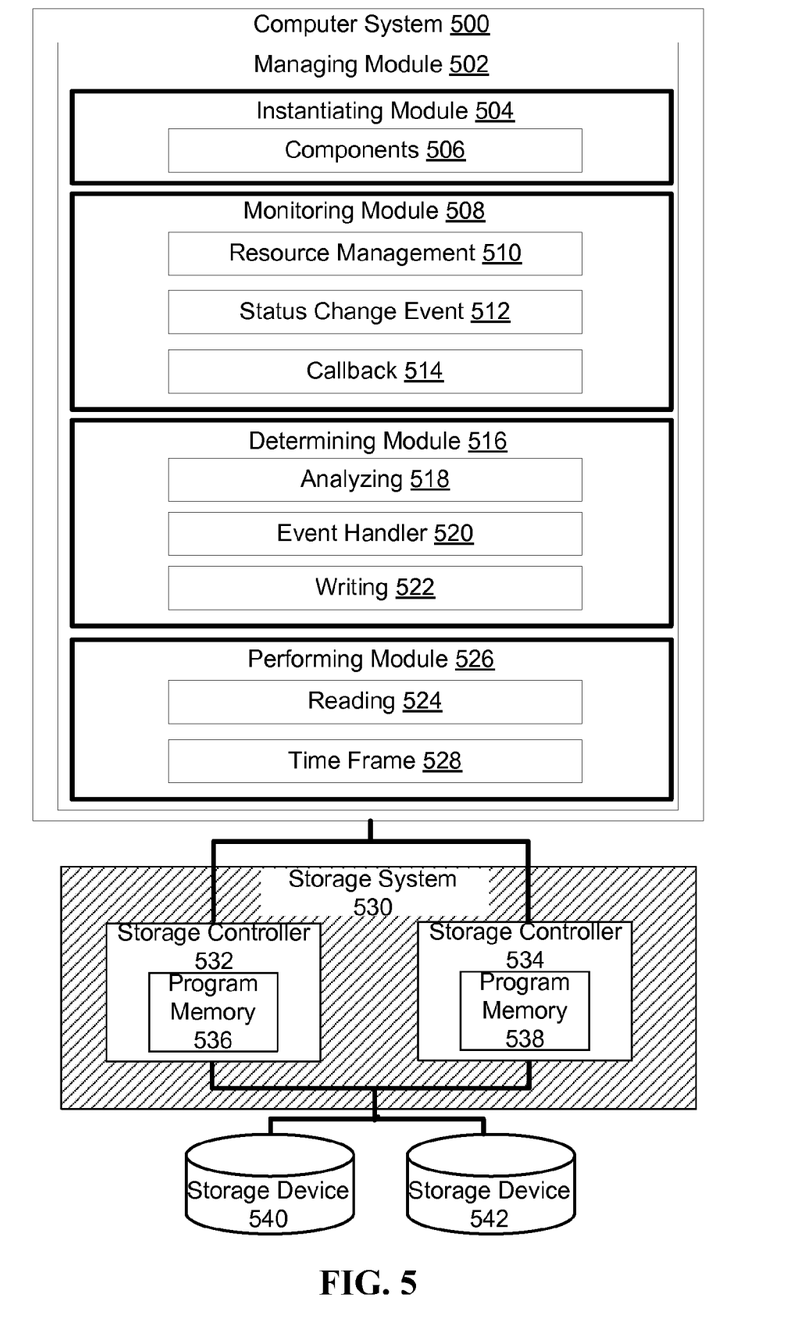
FIG. 5 illustrates modules of a system for managing a code load, according to embodiments.

FIG. 5 illustrates modules of a system for managing a code load, consistent with embodiments of the present disclosure. Consistent with various embodiments, method 200 can be implemented using one or more modules of FIG. 5. These modules can be implemented in hardware, software, or firmware executable on hardware, or a combination thereof. For example, these modules may be implemented on an exemplary computer system 500.

The computer system 500 can include a managing module 502. The managing module 502 can be configured and arranged to manage a code load. The managing module 502 can include an instantiating module 504, a components module 506, a monitoring module 508, a resource management module 510, a status change event module 512, a callback module 514, a determining module 516, an analyzing module 518, an event handler module 520, a writing module 522, a reading module 524, a performing module 526, and a time frame module 528.

The instantiating module 504 can be configured to instantiate a code load including a first update to a first component and a second update for a second component. The components module 506 can be configured to manage the components within the storage system. For instance, the first and second component may be storage devices configured within a data storage system.

The monitoring module 508 can be configured to monitor the operational state of the components within the storage system. Monitoring the operational state of the first and second components can include using a resource management module 510. The resource management module 510 can be configured to maintain a resource management database. The resource management database can include information regarding the operational state of the components within the storage system. For example, the resource management database can include information regarding whether a component is operational, non-operational, in a resource-fenced state, and the like. The resource management module 510 can include interfaces configured to allow system processes to register a callback function. The callback function can be managed by the callback module 514, and can be configured to be invoked in response to a status change event, wherein specific information in the resource management database changes. For example, the status change event could be associated with the first component changing from a non-operational state to an operational state. The status change event module 512 can be configured to detect and manage the status change event.

The determining module 516 can be configured to determine, in response to a triggering associated with the first component, to perform the first update. The triggering event can include a status change event of the operational state of the first component in the resource management database. For example, the status change event could be associated with the first component changing from a non-operational state to an operational state. Other triggering events are also possible. The determining module 516 can be further configured to make use of an analyzing module 518. The analyzing module 518 can be configured to analyze the triggering event and the operational state of the first component. The analyzing can be performed using an event handler module 520. The event handler module 520 can vary depending on the type and status change event of the first component. The determining module 516 can be further configured to make use of a writing module 522. The writing module 522 can be configured to write, in a system file, a recommended action to take regarding the first update. Additionally, the determining module 516 can further be configured to determine whether to perform the second update. Determining to perform the second update can occur within substantially the same time frame as performing the first update on the first component.

The performing module 526 can be configured to perform at least the first update in response to determining to perform the first update. Performing the first update can further comprise using a reading module 524. The reading module 524 can be configured to read the system file, and take the recommended action. For example, the recommended action can include suspending the code load, or continuing the code load. The time frame module 528 can be configured to manage the code load process such that determining to perform the second update can occur within substantially the same time frame as performing the first update on the first component.

As shown in FIG. 5, the computer system 500 can be communicatively connected to one or more storage controllers, such as storage controller 532 and storage controller 534 of storage system 530. The storage controllers 532 and 534 can be communicatively connected to one or more storage devices, such as storage devices 540 and 542. The modules of the computer system 500 can work in conjunction with the storage system 530. For example, the managing module 502 may facilitate a code load to storage controller 532 and storage controller 534 of storage system 530. As shown in FIG. 5, storage controller 532 can include program memory 536, and storage controller 534 can include program memory 538. Consistent with various embodiments, the program memory 536, 538 can include firmware that defines operation of the storage controllers 532, 534.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for managing a code load for a storage system comprising:
   instantiating a code load, the code load including a first firmware update for a storage controller and a second firmware update for an interface adapter;
   monitoring, in response to instantiating the code load, a first operational state of the storage controller;
   maintaining a resource management database that includes information regarding the operational state of the storage controller, the interface adapter, and other devices in the storage system;
      wherein the resource management database contains a respective operational status, a respective serial number, a respective interface card identification number, and a respective power supply identification number for each respective device in the storage system;
      wherein the resource management database includes interfaces configured to allow system processes to register a callback function that will be invoked when a respective operational status in the resource management database changes;
   determining, in response to a triggering event, to perform the first firmware update, wherein the triggering event comprises a change in the operational state of the storage controller;
   performing, in response to determining to perform the first firmware update, the first firmware update;
   analyzing, within the same time frame as performing the first firmware update, an operational state of the interface adapter;
   writing, in response to the analyzing, a recommended action to take regarding the second firmware update for the interface adapter; and
   performing, in response to performing the first firmware update and writing the recommended action, the recommended action to take regarding the second firmware update for the interface adapter.

2. The method of claim 1, wherein determining to perform the first firmware update further comprises:
   analyzing, by an event handler, the triggering event and the operational state of the storage controller to determine a recommended action; and
   writing, in a system file, the recommended action regarding the first firmware update.

3. The method of claim 2, wherein the event handler is chosen from a plurality of event handlers based on the type of device and the type of the status change event.

4. The method of claim 2, wherein performing the first firmware update further comprises reading the system file, and taking the recommended action.

5. A computer implemented method for managing a code load for a storage controller and an interface adapter of a storage system, the method comprising:
   instantiating a code load, the code load including a first firmware update for the storage controller and a second firmware update for the interface adapter;
   monitoring, in response to instantiating the code load, the operational state of the storage controller and the interface adapter;
   maintaining a resource management database that includes information regarding the operational state of the storage controller, the interface adapter, and other devices in the storage system;
      wherein the resource management database contains a respective operational status, a respective serial number, a respective interface card identification number, and a respective power supply identification number for each respective device in the storage system;
      wherein the resource management database includes interfaces configured to allow system processes to register a callback function that will be invoked when a respective operational status in the resource management database changes;
   determining, in response to a status change event associated with the operational state of the storage controller, to perform the first firmware update; and
   performing, within the same time frame as determining to perform the second firmware update, at least the first firmware update in response to determining to perform the first firmware update.

6. The method of claim 5, wherein determining to perform the first firmware update further comprises:
   analyzing, by an event handler, of the status change event and the operational state of the storage controller, wherein the event handler can be selected based on the type of the status change event; and
   writing, in a system file, a recommended action to take regarding the first firmware update.

7. The method of claim 6, further comprising:
   reading the system file, and taking the recommended action.

8. A computer program product for managing a code load of a storage system comprising a storage controller and an interface adapter, the computer program product comprising a computer readable storage medium having program instructions embodied therewith, wherein the computer readable storage medium is not a transitory signal per se, the program instructions executable by a processor to cause the processor to perform a method comprising:
   instantiating a code load, the code load including a first firmware update for the storage controller;
   monitoring, in response to instantiating the code load, the operational state of the storage controller;
   maintaining a resource management database that includes information regarding the operational state of the storage controller, the interface adapter, and other devices in the storage system;
      wherein the resource management database contains a respective operational status, a respective serial number, a respective interface card identification number, and a respective power supply identification number for each respective device in the storage system;

wherein the resource management database includes interfaces configured to allow system processes to register a callback function that will be invoked when a respective operational status in the resource management database changes;

determining, in response to a triggering event associated with a change in the operational state of the storage controller, to perform the first firmware update;

performing at least the first firmware update in response to determining to perform the first firmware update;

analyzing, within the same time frame as performing the first firmware update, the operational state of the interface adapter;

writing, in response to the analyzing, a recommended action to take regarding a second firmware update for the interface adapter; and performing, in response to performing the first firmware update and writing the recommended action, the recommended action to take regarding the second firmware update for the interface adapter.

9. The computer program product of claim 8, wherein determining to perform the first firmware update further comprises;

analyzing, using an event handler, the triggering event and the operational state of the storage controller; and writing, in a system file, a recommended action to take regarding the first firmware update.

10. The computer program product of claim 9, wherein a different event handler can be used depending on the type of device and the type of status change event.

11. The computer program product of claim 9, wherein performing the code-load further comprises reading the system file, and taking the recommended action.

* * * * *